Dec. 7, 1943.    G. F. ALBRECHT    2,336,382
BEVERAGE VENDING MACHINE
Filed March 17, 1941    4 Sheets-Sheet 1
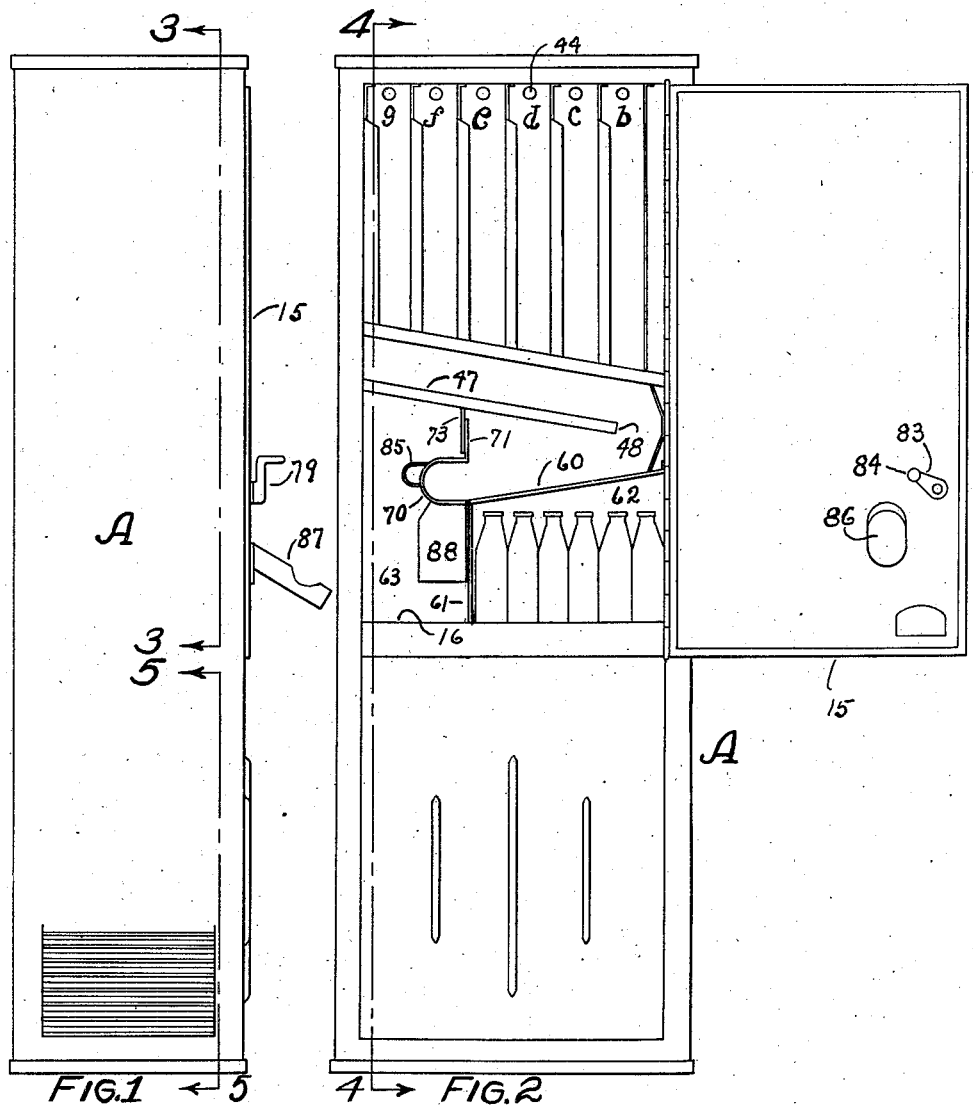
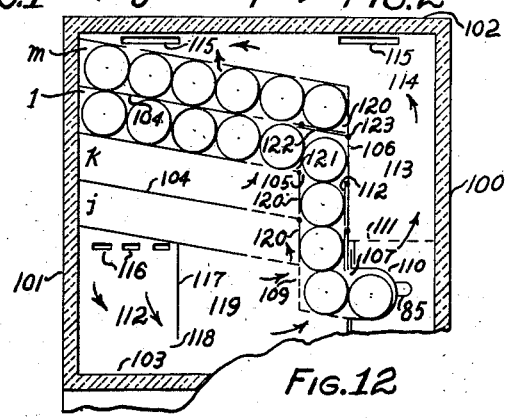
INVENTOR
GILMON F. ALBRECHT
BY　A.S.Krol
ATTORNEY Dec. 7, 1943.   G. F. ALBRECHT   2,336,382
BEVERAGE VENDING MACHINE
Filed March 17, 1941   4 Sheets-Sheet 2

INVENTOR
GILMON F. ALBRECHT
BY  A.S.Krob
ATTORNEY

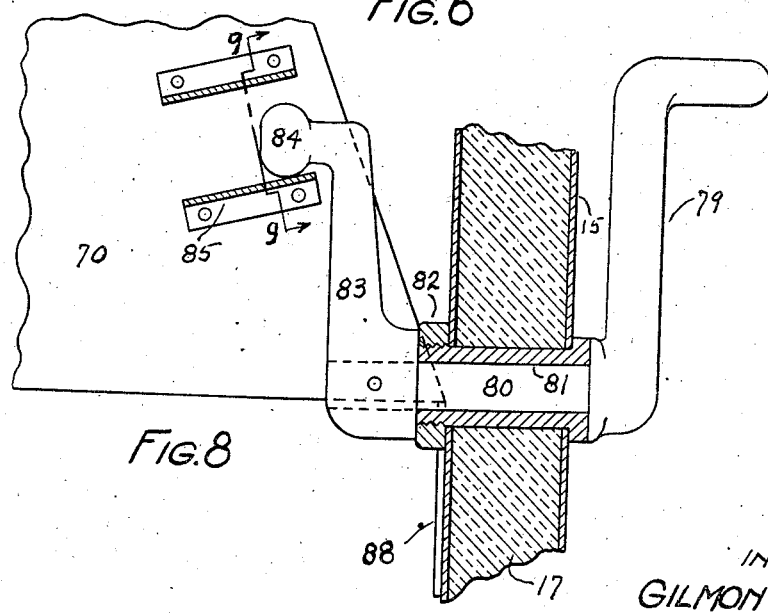

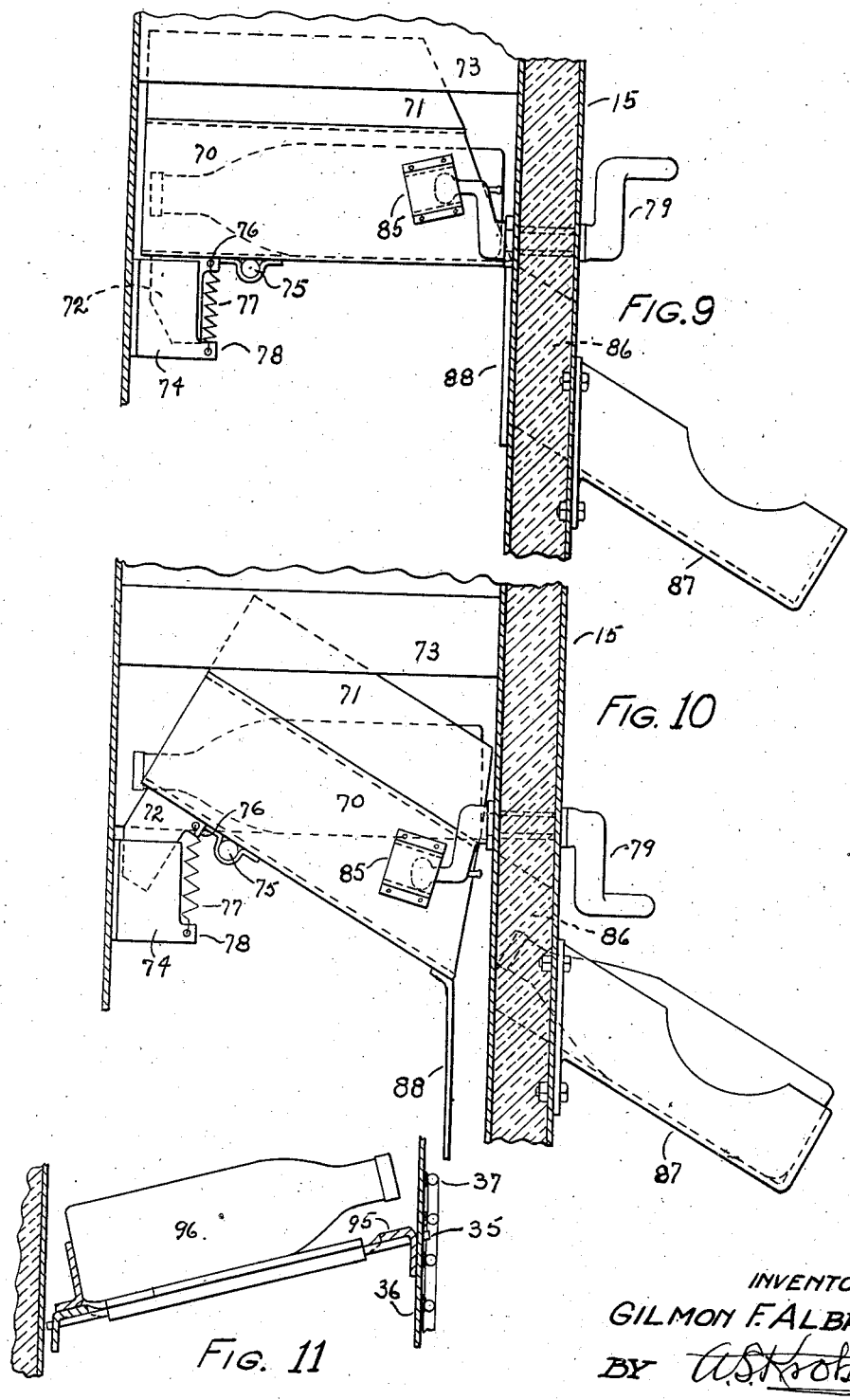

Patented Dec. 7, 1943

2,336,382

UNITED STATES PATENT OFFICE 2,336,382

BEVERAGE VENDING MACHINE

Gilmon F. Albrecht, Madison, Wis.

Application March 17, 1941, Serial No. 383,718

6 Claims. (Cl. 312—36)

The present invention relates to bottle venders wherein the bottles may be removed one at a time by means which is controlled by a coin receiving device.

An object of my invention is to provide a number of parallel rows of inclined or vertically positioned bottle holding channels cooperating with gate valves, one for each channel, whereby the bottles in the individual channels may be removed therefrom and the channels emptied consecutively.

Another object of the present invention is to provide a bottle vending cabinet having maximum capacity and efficient means for prestoring the bottles before being placed in the bottle holding channels.

A further object of my invention is to provide bottle dispensing means which act to automatically close the opening in the cabinet through which the bottles are discharged.

A still further object of the present invention is to provide a cabinet wherein when the door of the cabinet is open, the dispensing device, channels and prestorage chamber or chambers are exposed whereby any bottle or group of bottles may be removed manually and whereby a fresh supply of bottles from the prestorage chamber may be added to the dispensing channels.

It will be understood that the means shown for cooling and circulating air through the device form no part of this invention as recited in the appended claims.

To these and other useful ends, my invention consists of parts, combinations of parts, or their equivalents, and mode of operation, as hereinafter set forth and claimed and shown in the accompanying drawings in which:

Fig. 1 is a side elevational view of my improved cabinet dispensing device with the door closed.

Fig. 2 is a front elevational view of the cabinet shown in Figure 1 with the door open, showing the position and shape of the bottle holding channels and the path through which the bottles move to the dispensing valve, the prestorage chamber being shown filled with bottles.

Fig. 4 is a fractional view of the inclined guideway, a portion being sectioned in order to illustrate the position of the valve holding means when the valve is open.

Fig. 5 is a transverse sectional view of the inclined guide-way taken on line 5—5 of Figure 4.

Fig. 6 is a fractional top view of the inclined guide-way.

Fig. 7 is a diagrammatic drawing illustrating a fraction of the bottle dispensing device and the manually operated arm which controls the same.

Fig. 8 is a fractional side elevational view of the dispensing device showing the door and sleeve in section forming a bearing for the operating means.

Fig. 9 is a view similar to Figure 8, illustrating an elevational view of the bottle dispensing means showing a bottle by dotted lines in this dispensing means, as also illustrated in Figure 3.

Fig. 10 is a view similar to Figure 9 except illustrating the bottle dispensing means after being moved to the bottle discharging position, and illustrating by dotted lines the bottle which is ready to be received by the dispensing means after it returns to the position shown in Figure 9.

Fig. 11 illustrates fractionally a modification.

Fig. 12 illustrates fractionally another modification.

Figure 3:
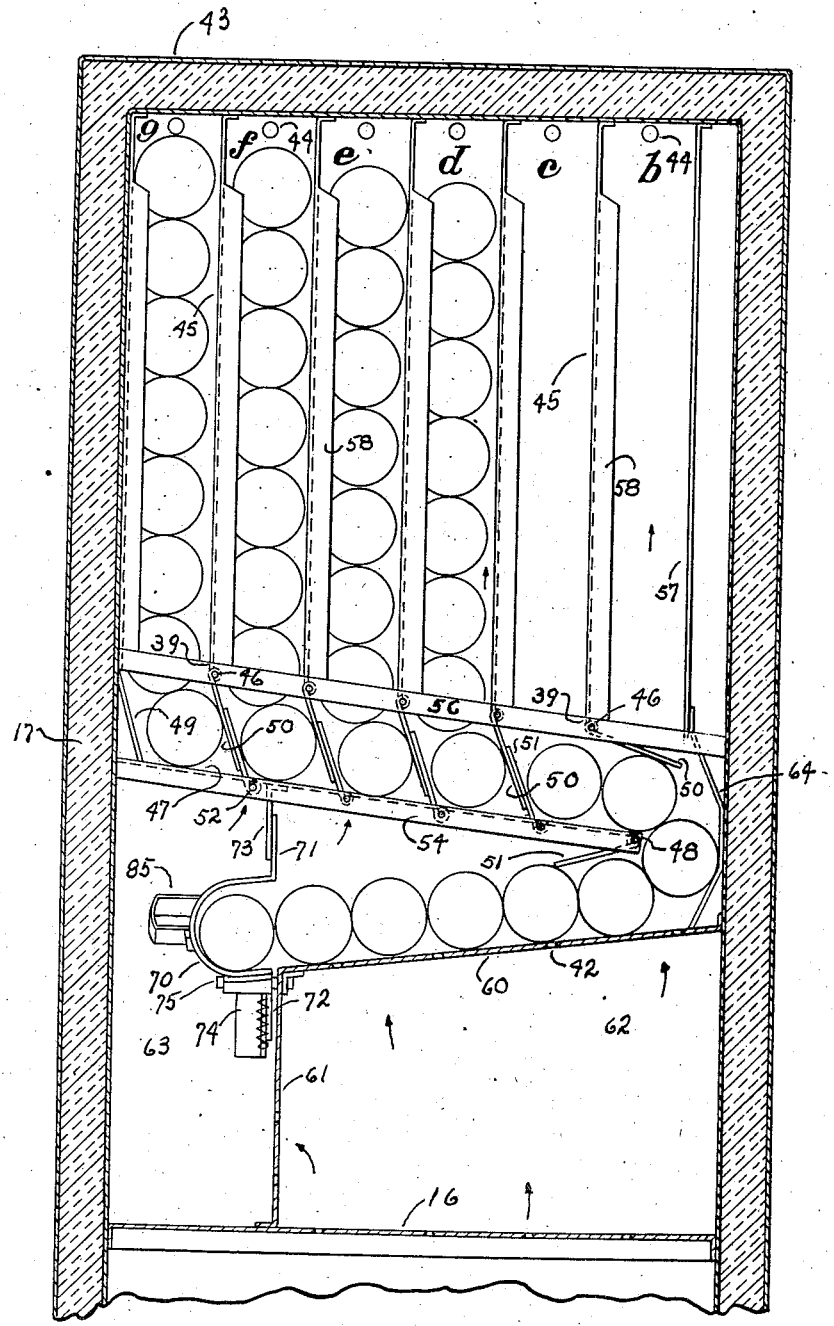
Fig. 3 is an enlarged view of the bottle holding and dispensing means and the prestorage chamber, taken on line 3—3 of Figure 1.

As thus illustrated, the cabinet in its entirety is designated by reference character A. The door of the cabinet is designated by numeral 15, the door being shown in its closed position in Figure 1 and in its wide open position in Figure 2. The upper chamber of the cabinet is formed by a horizontal partition 16 (see Figure 3). This portion of the cabinet is adapted to be exposed when the door is open.

The upper portion of the cabinet A is surrounded by double walls having insulating material 17 therebetween.

I provide spaced partitions 45 (see Figure 3) which extend preferably from the top of the compartment to a point as at 39 forming vertical channels b, c, d, e, f and g. Partitions 45 differ in length so points 39 are at a slightly downwardly extending angle toward the right side of the compartment.

I position an inclined partition 47 a distance slightly greater than the diameter of the bottles below points 39, as illustrated, partition 47 being parallel with points 39 and extending from the left wall of the compartment, terminating as at 48.

At the left end of partition 47, I provide an angled panel 49, the purposes of which will be obvious. I preferably pivot at the bottom ends of partitions 45 gate valves 50, as at 46, each being adapted to rest in the position shown in Figure 3; thus members 49 and 50 form extensions to the channels, terminating at or near member 47, the extensions being angled, as illustrated, toward the right hand discharge end of the partition.

In order to prevent gate valves 50 from pressing too hard against the bottles in the forward or adjacent channel, I pivot a supplemental gate 51 to member 47 as at 52, the axis of the pivot being a rod 53 (see Figure 5) which extends through the downwardly extending flanges 54 of member 47 (see Figures 4, 5 and 6).

Member 47 is preferably depressed for its length for a distance slightly wider than members 51 so as to form a channel into which members 51 may lie, the bottom of the channel being designated by numeral 55; thus it will be seen that members 51, when down in the position shown in Figure 4, will be flush with member 47.

As illustrated in Figure 3, the forward supplemental gate 51 can swing around and under member 47. It will be noted that narrow transverse cut-away portions 51a are provided so as to make room for the hinged portions of members 51. In order to anchor the lower front corners of members 45, I provide a strip 56 which is anchored to the side walls of the cabinet (see Figure 3) and to which members 45 are secured. As a matter of convenience, the rods 46, which answer as an axis for members 50 are extended through member 56. I provide a sub-partition 57 forming the right hand surface for channel b.

When the last bottle in the right hand channel has dropped below supplemental gate 51, the adjacent gate 50 will be permitted to swing upwardly so the bottles in the second channel from the right side of the device will move into the position shown in Figure 3 and thereafter the bottles in the second channel will be permitted to move toward the dispensing device.

The movement of the bottles through the entire device will be understood by scrutinizing the showing in Figure 3. As the bottles in a channel are moved and the last one moved away from its valve 51, this valve will swing forwardly and lie in the position illustrated in Figures 3 or 4 and valve 50 will swing forwardly and lie in the position shown at the right of Figure 3. Clearly all of the bottles can be removed through the dispenser outlet from the channels consecutively, beginning with channel b and ending with channel g. Obviously the weight on any one bottle can never be more than the weight of seven bottles in the design shown in Figure 3.

In Figures 2 and 3, I illustrate a guide-way partition 60 and a vertical partition 61 forming chambers 62 and 63, chamber 62 answering as a prestorage chamber (see Figure 2) and chamber 63 containing the dispensing device including its coin mechanism and coin receptacle.

Member 60, it will be noted, cooperates with member 64 which is shaped, as illustrated in Figure 3, to form a guide-way for the bottles to the bottle dispensing device, as clearly illustrated in Figure 3.

When it is desired to refill the vertical channels, for example channels b and c and the bottles are in the position shown in Figure 3, door 15 is opened and the bottles directly under channel b and under supplemental gate valve 51 are removed and the valve and gate valve are moved to the position shown under the other channels. Then bottles enough are replaced so a bottle lies against member 51, after which the two empty channels may be filled from the prestorage chamber 62.

It will be seen that the opening of the door presents the ends of the bottles to full view of the operator and that it will be a simple matter to position the gate valves into holding position and refill the emptied channels.

The device which permits the bottles to be dispensed one at a time is as follows:

The body of the dispensing device 70 (see Figures 3, 8, 9 and 10) is U-shaped, so when this device is in its normal position, the last bottle on member 60 will roll into member 70, (see Figure 3) the open side of the dispenser being about in vertical alignment with the point of contact between the two bottles.

Member 70 is provided with an upwardly extending flange 71 and a downwardly extending flange 72, the latter being in loose contact with member 61.

I provide a downwardly extending bracket 73 and another bracket 74. These two brackets act to hold member 70 against the pressure of the bottles. Member 70 is pivoted at the bottom and near the rear end on a pin 75, the pin being secured to members 60 and 61 by means of a bracket, as illustrated.

Member 72 is provided with a forwardly and outwardly extending portion 76 to which a spring 77 is attached. The lower end of member 74 is provided with a forwardly extending portion 78 to which the lower end of the spring is attached. Member 70 will be spring held in the position shown in Figures 3 and 9 and when in this position, a bottle will lie in this member, as illustrated by dotted lines in Figure 9.

When member 70 is moved to a discharging position, member 71 is moved so as to hold the next bottle which is shown by dotted lines in Figure 10, from moving forwardly.

I provide a manually operated crank 79 having a shaft 80 which is rotatably mounted in a sleeve 81, the sleeve being rigidly held in door 15 by means of a nut 82. I secure a crank 83 to the inner end of shaft 80 which is provided with an extended knob 84 being separated somewhat from member 83 by a reduced neck.

I secure a U-shaped bracket 85 to member 70, as clearly illustrated in Figures 3 and 7 to 10 inclusive into which member 84 is loosely positioned. It will be seen that crank 79 may be pressed downwardly from the position shown in Figures 8 and 9 to the position shown in Figure 10, after which the bottle will slide out an opening 86 in the door to a receiving bracket 87, as illustrated in Figure 10.

It will be seen that as long as there are bottles in the channels, beginning with channel b, every time the dispenser 70 is rocked on its pivot 75, as illustrated, a bottle will be dispensed. When the dispensing device is in the position illustrated in Figure 9, the interior of compartment 63 would normally be exposed to the exterior. In order to seal opening 86 while the dispenser is in normal position, I attach a downwardly depending member 88 to member 70 in the position shown in Figure 9.

In devices of the class, it is customary to provide a coin releasing device for the means which operates the dispenser. This coin controlling device forms no part of the present invention. Such devices are well known in the art and therefore it is thought unnecessary to illustrate this part of the device in the figures.

It will be sufficient to state that when the dispensing device is in the position shown in Figure 9, the coin device will lock the members against movement and the coin controlling means is adapted to unlock the dispensing device when a coin is dropped into the slot. After the dispensing device is returned to normal, it is again locked.

In the figures, it is expected that the bottles will be positioned in a horizontal position. In one design, as illustrated fractionally in Figure 11, a guide-way 95 which is similar to guide-way 47 is positioned at a considerable angle. This design is adapted for dispensing milk bottles, the bottles being designated by numeral 96.

All of the bottles in the various channels will be held at the angle illustrated; furthermore the dispensing device and the guide-way similar to member 60 may be positioned at the same angle. The other parts of the device will operate exactly the same as the parts shown in the other figures. The object of placing milk bottles at an angle is to a large extent to remove the pressure against the bottle caps.

In Figure 12, I illustrate fractionally my invention wherein the channels are positioned transversely but at a sufficient angle so the bottles will roll toward the dispensing end of the channels.

In this design, the right hand side wall of the cabinet is designated by reference numeral 100, the left side wall of the cabinet is designated by reference numeral 101. The top wall of the cabinet is designated by numeral 102 and the bottom insulated partition wall in the cabinet is designated by numeral 103.

Guideways 104 are positioned at a sufficient angle and spaced slightly further apart than the diameter of the bottles forming channels j, k, l and m. These partitions extend from panel 101 terminating as at 105.

I provide a vertical partition wall 106 which extends preferably from the top of channel m to member 103 having an opening 107 which is somewhat larger than the diameter of the bottles so the bottles can roll by gravity into the dispenser 110.

The lower channel 104 is provided with an extension 109 which terminates at the bottom of opening 107. The dispenser means 110 and all of its connected parts are similar to that shown in the other figures.

Partitions 104, 109 and partition 111 are preferably perforated as illustrated; thus precooling compartments 112 and 113 are provided wherein the bottles are preferably stacked horizontally.

I preferably pivotally mount gate valves 120 on the lower ends of members 104 as at 121. These valves are adapted to lie between the vertical rows of bottles in the unemptied channels. When a channel is emptied, for example channels j and k, gate valves 120 will be free to drop into the position shown over channels j and k; thus permitting the bottles from the next above channel to move forwardly and downwardly to the dispenser.

In order to hold valves 120 horizontally against the weight of bottles, I provide supplemental valves 122 which are hinged in a suitable manner to partition 106 as at 123. When the bottles are all dispensed from, for example channels j and k, and the last bottle moved downwardly out of contact with member 122, this member and member 120 will be permitted to drop to a vertical position; thus permitting the bottles from channel l to move forwardly and downwardly toward the dispenser.

It will be seen that the channel next to the dispenser is the first to be emptied and then the channels will be emptied consecutively as in the other design. In this design, compartments 112 and 113 provide a considerable prestorage space. The openings in members 104, 109, 111, 114 and 117 form air passageways through the system as clearly illustrated by arrows.

In Figure 3, it will be noted that I show flanges 58 on the forward end of members 45 which act to prevent the bottles from moving forwardly when the door is open. These flanges will not prevent the operator from removing bottles from any one of the channels.

Clearly many minor detail changes may be made without departing from the spirit and scope of the present invention, as recited in the appended claims. For example, the means for closing the space between members 45 and 47 may be differently designed.

I may elect to provide some other means for locking members 50 into position and holding them in their locked position until the forward bottle causes the locking mechanism to release its valve.

Having thus shown and described my invention, I claim:

1. A vending device of the class described for elongated circular in cross section packages, comprising a cabinet, a number of vertically arranged channels in the top of said cabinet, each adapted to hold a number of said packages when positioned substantially horizontally, an inclined track spaced below said channels a distance slightly greater than the diameter of the packages, gate valves positioned between said channels and said inclined track and adapted to be held temporarily closed by the packages on the sides of the valves toward the low end of the track, a dispensing valve and means whereby said packages will move consecutively by gravity into the dispensing valve when in its normal position, said dispensing valve being open at its front end and hinged transversely at or near the rear end thereof, an inclined outlet through the wall of said cabinet having its inner end positioned directly below the dispensing valve and means whereby when the dispensing valve is operated, its open end is moved in alignment with said outlet and the package in the dispensing valve permitted to slide endwise through the outlet, means on said valve adapted to hold the adjacent package from moving until the valve is returned to its normal position.

2. A device as recited in claim 1 including: said gate valves being hinged at their tops adjacent the bottoms of the partitions forming said channels, locking means hinged to said inclined track each adapted to form a rest for said valves and being held in their locked position by contact with the adjacent package.

3. A vending machine of the class described, for elongated circular in cross section packages, comprising a cabinet and means whereby a number of packages may be stored in the top of the cabinet in a substantially horizontal position, a dispensing valve in said cabinet and means whereby the packages will be caused to move into said dispensing valve consecutively by gravity, said dispensing valve being transversely hinged at or near its rear end and being open at its front end and means whereby the open end of the valve may be moved downwardly on said hinge as an axis, an inclined opening in said cabinet positioned to register with the open end of the valve when the valve is in its lowest position whereby the packages will slide endwise from the valve through said opening, means whereby when said valve is moved to its open position, the adjacent package will be held from moving toward the valve until the valve is again in its normal position.

4. A device as recited in claim 3 including; a door adapted to close the front of said cabinet and to expose to view all of the packages and the dispensing valve when said door is open, and whereby the packages may be removed and replaced, said inclined opening in said cabinet being positioned in said door.

5. A device as recited in claim 3 including; means secured to the open end of said dispensing valve adapted to close said inclined opening when the valve is in its normal position.

6. A device as recited in claim 3 including; a shaft rotatably mounted in the door of said cabinet having an operating connection to said dispensing valve and a lever on the exterior of the cabinet whereby the valve may be operated manually to deliver a package, a spring operatively connected to said dispensing valve adapted to return the valve to its normal position.

GILMON F. ALBRECHT.